(12) United States Patent
Morioka et al.

(10) Patent No.: US 7,092,333 B2
(45) Date of Patent: Aug. 15, 2006

(54) DEVICE AND PROGRAM FOR CHECKING OPTICAL DISKS

(75) Inventors: Kouichi Morioka, Katano (JP);
Takashi Yumiba, Kyotanabe (JP);
Keiichi Kawashima, Hirakata (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 730 days.

(21) Appl. No.: 10/122,303

(22) Filed: Apr. 16, 2002

(65) Prior Publication Data
US 2002/0159356 A1    Oct. 31, 2002

(30) Foreign Application Priority Data
Apr. 17, 2001   (JP) .............................. 2001-117847

(51) Int. Cl.
*G11B 20/10* (2006.01)
(52) U.S. Cl. .............................. 369/53.12; 369/44.32; 369/53.15; 369/53.17; 369/47.14
(58) Field of Classification Search ............. 369/53.21, 369/53.11, 53.26, 59.1, 59.17, 59.12, 59.25, 369/47.35, 275.1, 275.3, 275.4, 44.26, 47.3, 369/47.5, 44.32, 47.14, 53.12, 53.17, 53.15
See application file for complete search history.

(56) References Cited
U.S. PATENT DOCUMENTS

| | | | | | |
|---|---|---|---|---|---|
| 4,873,680 | A | * | 10/1989 | Chung et al. ............. | 369/59.12 |
| 5,696,757 | A | * | 12/1997 | Ozaki et al. ............. | 369/47.35 |
| 6,031,815 | A | * | 2/2000 | Heemskerk ............... | 369/275.3 |
| 6,108,296 | A | * | 8/2000 | Kajiyama et al. ......... | 369/275.4 |
| 6,335,912 | B1 | * | 1/2002 | Kobayashi et al. ......... | 369/59.1 |
| 6,504,800 | B1 | * | 1/2003 | Kuwahara et al. ........ | 369/44.26 |
| 6,775,227 | B1 | * | 8/2004 | Watanabe et al. ......... | 369/275.3 |

OTHER PUBLICATIONS

U.S. Appl. No. 09/832,960, filed Apr. 12, 2001, entitled *"Optical Disc, Reproduction Apparatus, and Disc Identifier Selecting Apparatus"*, by Koichi Morioka et al.

* cited by examiner

*Primary Examiner*—Thang V. Tran
*Assistant Examiner*—Kim-Kwok Chu
(74) *Attorney, Agent, or Firm*—Wenderoth, Lind & Ponack, L.L.P.

(57) ABSTRACT

A plurality of tracks on an optical disk are optically read to obtain a signal containing a plurality of LOW segments. Each of the plurality of LOW segments should correspond to a certification pit. Accordingly, if the interval between LOW segment $X_j$ and nth succeeding LOW segment $X_{j+n}$ exceeds the length of one track, a defect pit that could be confused with a certification pit is judged as being present between two certification pits.

12 Claims, 12 Drawing Sheets

FIG.9

CERTIFICATION PIT INFORMATION STORING UNIT

|  | SERIAL NUMBER | SECTOR ADDRESS | WIDTH | JUDGEMENT FIELD |
|---|---|---|---|---|
| CERTIFICATION PIT INFORMATION 1 | 1 | A | 30 | — |
| CERTIFICATION PIT INFORMATION 2 | 2 | A+10 | 40 | — |
| CERTIFICATION PIT INFORMATION 3 | 3 | A+24 | 50 | — |
| CERTIFICATION PIT INFORMATION 4 | 4 | A+36 | 33 | — |
| CERTIFICATION PIT INFORMATION 5 | 5 | A+46 | 38 | — |
| ... | ... | ... | ... | ... |

FIG.11A
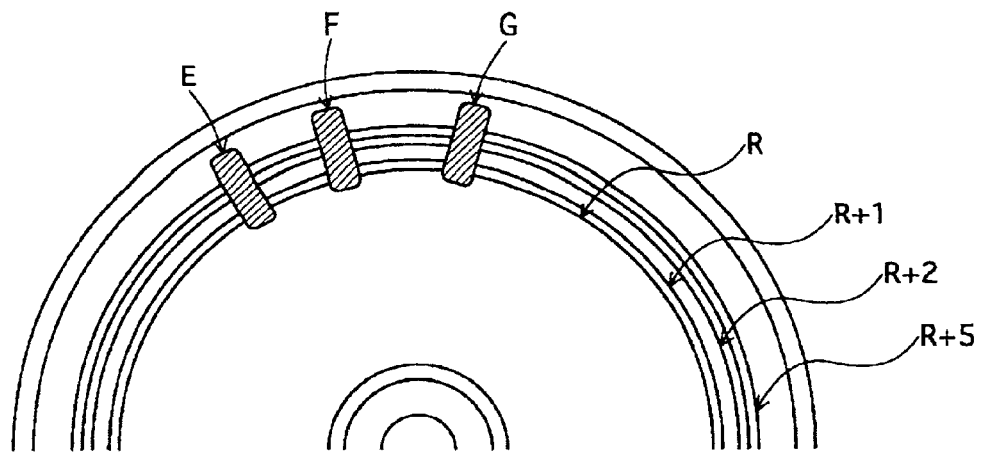
FIG.11B
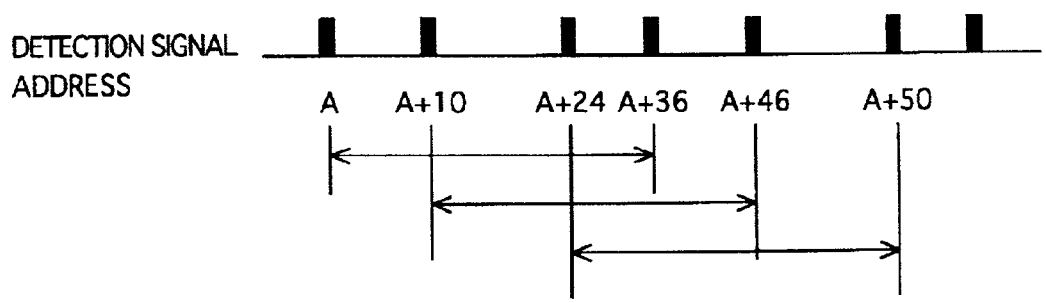
FIG.11C
| SERIAL NUMBER | SECTOR ADDRESS | WIDTH | JUDGEMENT FIELD |
|---|---|---|---|
| 1 | A | 30 | — |
| 2 | A+10 | 40 | — |
| 3 | A+24 | 50 | — |
| 4 | A+36 | 33 | — |
| 5 | A+46 | 38 | — |
| ... | ... | ... | ... |
FIG.11D
| SERIAL NUMBER | SECTOR ADDRESS | WIDTH | JUDGEMENT FIELD |
|---|---|---|---|
| 1 | A | 30 | NORMAL |
| 2 | A+10 | 40 | — |
| 3 | A+24 | 50 | — |
| 4 | A+36 | 33 | NORMAL |
| 5 | A+46 | 38 | — |
| ... | ... | ... | ... |

FIG.12A
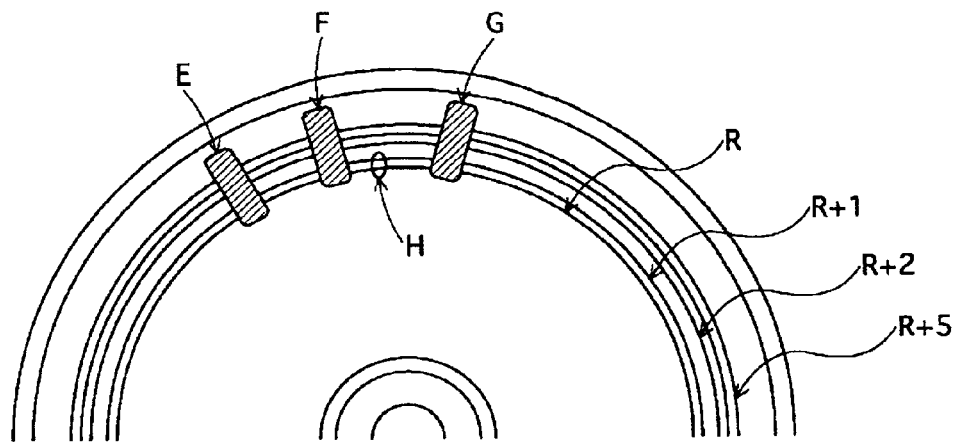
FIG.12B
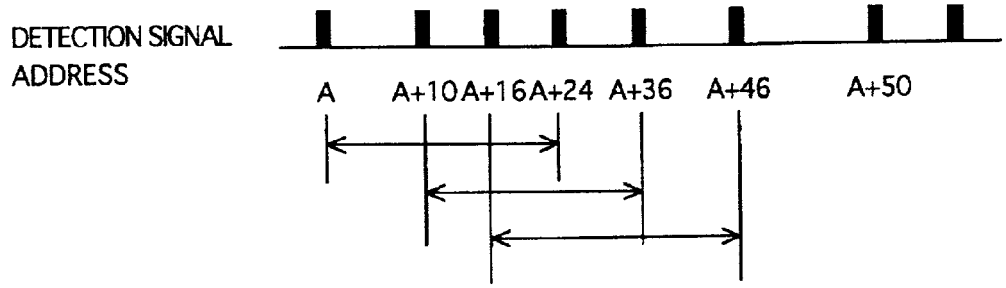
FIG.12C
| SERIAL NUMBER | SECTOR ADDRESS | WIDTH | JUDGEMENT FIELD |
|---|---|---|---|
| 1 | A | 30 | — |
| 2 | A+10 | 40 | — |
| 3 | A+16 | 20 | — |
| 4 | A+24 | 50 | — |
| 5 | A+36 | 33 | — |
| ... | ... | ... | ... |
FIG.12D
| SERIAL NUMBER | SECTOR ADDRESS | WIDTH | JUDGEMENT FIELD |
|---|---|---|---|
| 1 | A | 30 | ABNORMAL |
| 2 | A+10 | 40 | ABNORMAL |
| 3 | A+16 | 20 | ABNORMAL |
| 4 | A+24 | 50 | ABNORMAL |
| 5 | A+36 | 33 | — |
| ... | ... | ... | ... |

FIG.13A
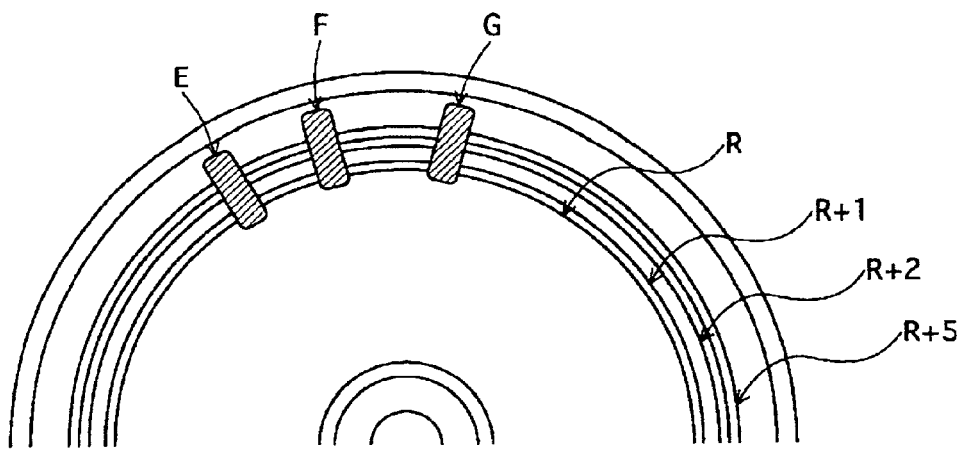
FIG.13B
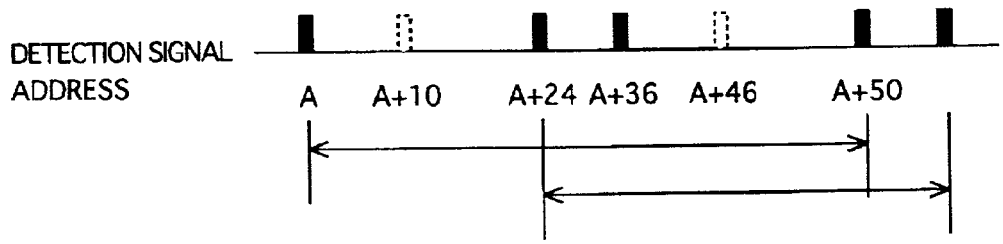
FIG.13C
| SERIAL NUMBER | SECTOR ADDRESS | WIDTH | JUDGEMENT FIELD |
|---|---|---|---|
| 1 | A | 30 | — |
| 2 | A+24 | 50 | — |
| 3 | A+36 | 33 | — |
| 4 | A+50 | 51 | — |
| ... | ... | ... | ... |
FIG.13D
| SERIAL NUMBER | SECTOR ADDRESS | WIDTH | JUDGEMENT FIELD |
|---|---|---|---|
| 1 | A | 30 | ABNORMAL |
| 2 | A+24 | 50 | ABNORMAL |
| 3 | A+36 | 33 | ABNORMAL |
| 4 | A+50 | 51 | ABNORMAL |
| ... | ... | ... | ... |

DEVICE AND PROGRAM FOR CHECKING OPTICAL DISKS

This application is based on an application No. 2001-117847 filed in Japan, the contents of which are hereby incorporated by reference.

BACKGROUND OF THE INVENTION

1. Field of the Invention

The present invention relates to a device that can appropriately check parts of an optical disk such as a CD or a DVD, which were processed for copyright protection purposes during the manufacturing of the optical disk.

2. Background Art

To meet the needs of the market for large amounts of low-priced digital works, manufacturers of optical disks run round-the-clock manufacturing for greater output. A manufacturing procedure of an optical disk is roughly made up of the following steps: (1) substrate formation; (2) reflective film application; (3) protective film coating; (4) substrate bonding; and (5) label printing. In recent years, a processing step that is intended for copyright protection is often added to this manufacturing procedure. The processing step writes special pits, which cannot be made by commercially available recording devices, onto an optical disk on which a digital work is recorded. The special pits serve as pits for certifying the authenticity of the optical disk (certification pits). With the provision of such certification pits, a reproduction device can distinguish original optical disks that record authentic digital works, from optical disks that record copies of the digital works. As one example, a pit having a length of 15T or more (T denotes a channel bit period) is used as a certification pit.

When manufacturing an optical disk, a defect which the reproduction device could confuse with a certification pit may naturally occur. Such a naturally-occurring defect causes the reproduction device to commit false recognition. Which is to say, the reproduction device may judge the optical disk as authentic at some time, but judge the same optical disk as not authentic at other times. Such false recognition can even lead to a quality dispute in the market. Therefore, optical disks should not be shipped without removing such naturally-occurring defects that are confusable with certification pits.

This problem can be overcome by introducing a step for checking the presence or absence of naturally-occurring defects. However, only a limited time can be spent for such a step. In manufacturing of optical disks that require mass production, if too much time is spent on the check, the production schedule would not be met.

SUMMARY OF THE INVENTION

The present invention has an object of providing a device that can quickly check whether a naturally-occurring defect that could be confused with a certification pit is present on an optical disk which has been processed for copyright protection purposes.

When n certification pits are provided on each of a plurality of tracks, the presence or absence of a naturally-occurring defect that is confusable with a certification pit can be checked by a check device having the following construction. Which is to say, the stated object can be achieved by a check device for checking, when n certification pits are provided on each of a plurality of adjacent tracks on an optical disk to certify that the optical disk is authentic, whether a naturally-occurring defect exists between any two certification pits, n being an integer that satisfies $n \geq 1$, each certification pit having a predetermined length that is out of specifications, and the defect having a length substantially equal to the predetermined length, the check device including: a reading unit for optically reading the plurality of tracks, to obtain a signal corresponding to the plurality of tracks; a detecting unit for detecting a plurality of signal segments which each have a duration corresponding to the predetermined length, from the signal; and a judging unit for judging, if an interval between any signal segment and an nth succeeding signal segment is different from a reference value, that a naturally-occurring defect exists between two certification pits.

If only certification pits formed by processing are present on a plurality of tracks, the interval between any signal segment and an nth succeeding signal segment is equal to a reference value. On the other hand, if a naturally-occurring defect that could be confused with a certification pit is present on the plurality of tracks together with the certification pits, a signal obtained by reading the plurality of tracks contains a signal segment corresponding to such a naturally-occurring defect. Accordingly, if the naturally-occurring defect exists, the interval between any signal segment and an nth succeeding signal segment is not equal to the reference value. Thus, the presence or absence of a naturally-occurring defect is judged by measuring the intervals between signal segments, so that the time taken for the check by the check device can be profoundly shortened. As a result, even if the step for performing the check by the check device is added to the manufacturing procedure of optical disks, the production schedule will not be missed. This delivers a remarkable effect of manufacturing copyrighted optical disks with high quality in large quantity.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings:

FIG. 9 shows a plurality of sets of certification pit information generated by a certification pit information generating unit shown in FIG. 7;

FIG. 11A shows a case where three processed parts E–G intersect tracks R and R+1;

FIG. 11B shows a detection signal that is output when tracks R and R+1 shown in FIG. 11A are read;

FIG. 11C shows five sets of certification pit information 1–5 which are generated based on the detection signal shown in FIG. 11B;

FIG. 11D shows five sets of certification pit information 1–5 with judgement fields having been set;

FIG. 12A shows a case where three processed parts E–G and naturally-occurring defect H intersect tracks R and R+1;

FIG. 12B shows a detection signal that is output when tracks R and R+1 shown in FIG. 12A are read;

FIG. 12C shows five sets of certification pit information 1–5 which are generated based on the detection signal shown in FIG. 12B;

FIG. 12D shows five sets of certification pit information 1–5 with judgement fields having been set;

FIG. 13A shows a case where an imperfectly-processed part intersects tracks R and R+1;

FIG. 13B shows a detection signal that is output when tracks R and R+1 shown in FIG. 13A are read;

FIG. 13C shows four sets of certification pit information 1–4 which are generated based on the detection signal shown in FIG. 13B;

FIG. 13D shows four sets of certification pit information 1–4 with judgement fields having been set.

DESCRIPTION OF THE PREFERRED EMBODIMENTS

First Embodiment

A check device of the first embodiment of the present invention is described below. Certification pits which are subjected to a check by this check device each have a length that is 15T or more and that is within a range where error correction by error-correcting codes is possible. Such a length that is 15T or more and that allows error correction to be performed is hereafter called "length X". The technical significance of using pits with length X as certification pits is as follows.

It is a known fact that a surfeit of casual copying has become a late social problem. To make a casual copy, a user connects a commercially available reproduction device with a commercially available recording device, reads a digital work recorded on an optical disk such as a CD-ROM or a DVD-ROM, and records it onto a recordable disk such as a hard disk, a CD-R, or a DVD-R.

Figure 1:
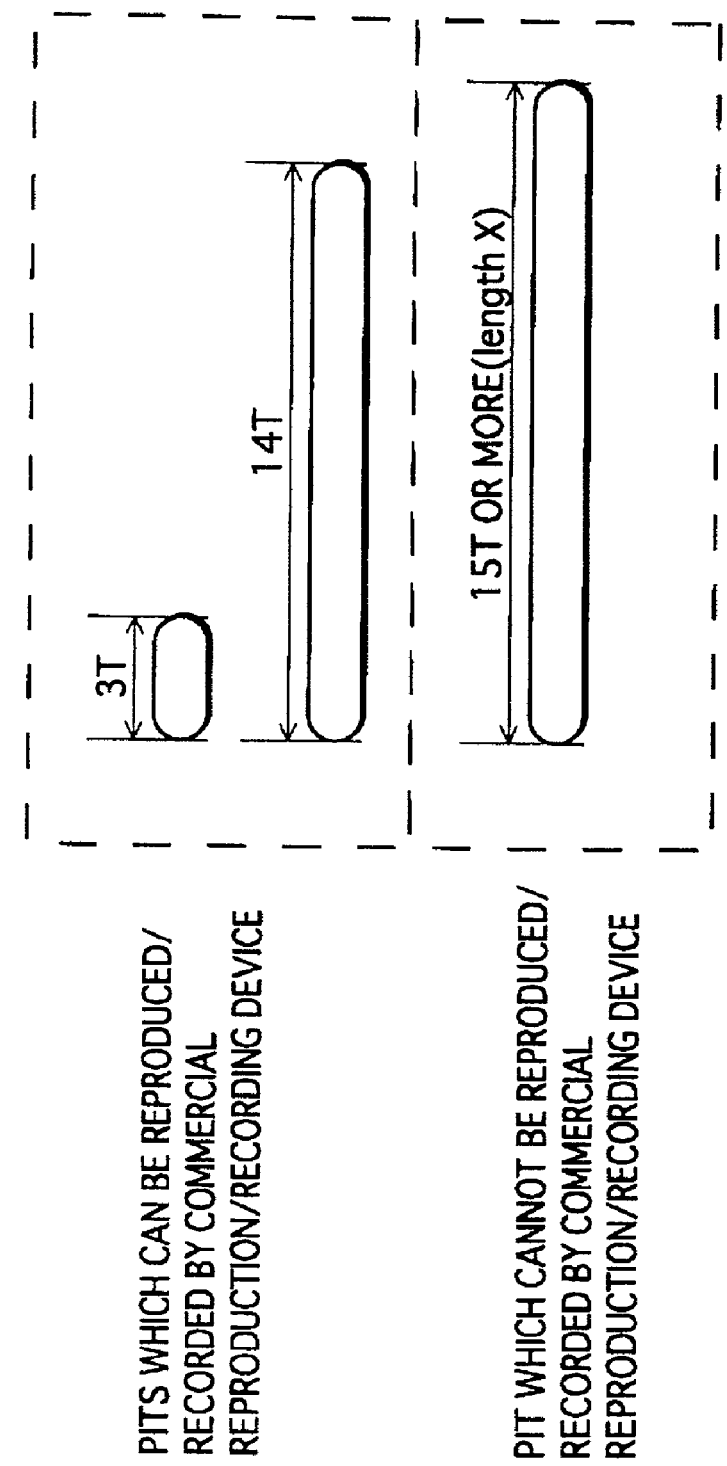
FIG. 1 shows a pit having a length X and two pits having lengths of 3T–14T in comparison.

However, a read signal obtained by optically reading the aforementioned certification pits contains LOW segments that last for 15T or more. Such a read signal cannot be reproduced by a commercially available reproduction device, and cannot be recorded onto another optical disk by a commercially available recording device. The reason for this is given below. On a DVD that is a representative optical disk, the length of each pit which shows data is typically 3T to 14T. This being so, upon reading a pit longer than this, the commercially available reproduction device or recording device judges that the read signal is out of specifications, and performs error correction to convert it to a read signal which is within specifications, before recording onto another optical disk. Therefore, a pit having length X cannot be recorded onto a recordable disk through casual copying. FIG. 1 shows a comparison of a pit having length X and two pits having lengths of 3T–14T. Thus, by checking the presence of pits having length X, authentic disks manufactured by authorized manufacturers can be distinguished from recordable disks unauthorizedly manufactured by means of casual copying. Note that though the length of each certification pit is 15T or more in this embodiment, it should be obvious the length is not limited to such.

Figure 2:
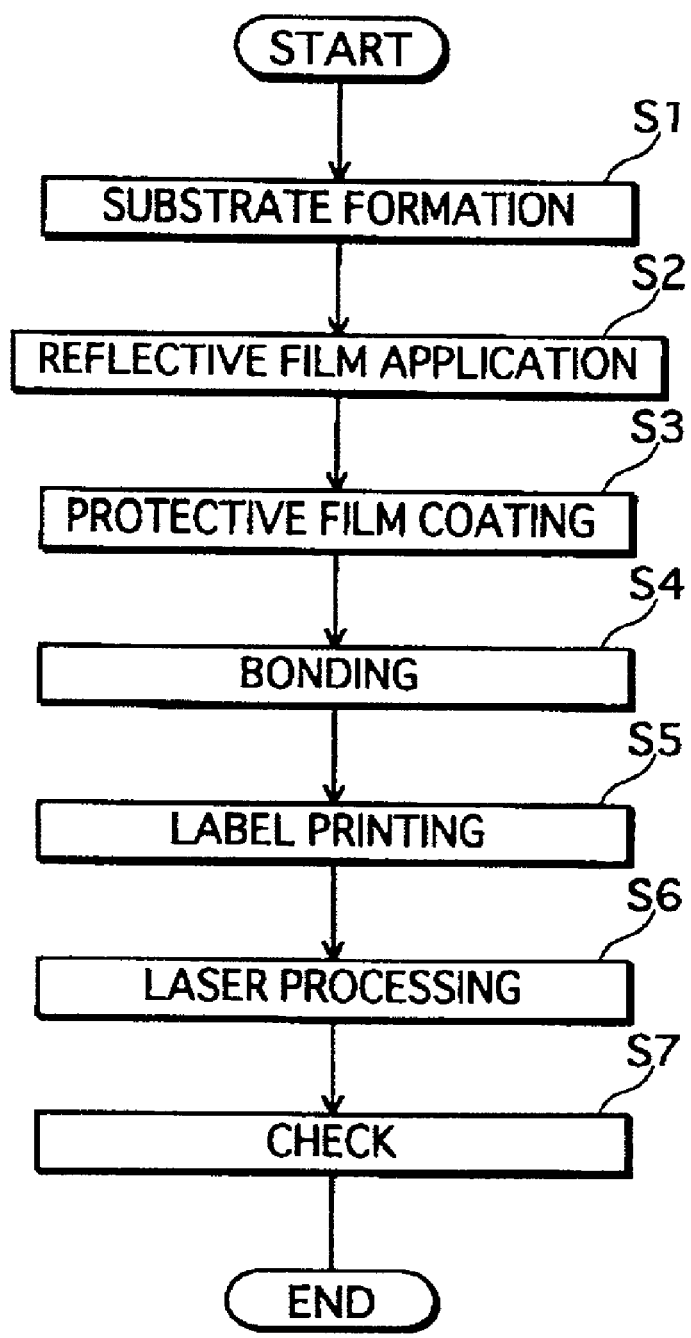
FIG. 2 shows a manufacturing procedure of an optical disk to which the embodiments of the present invention relate.

The following explains a manufacturing procedure of an optical disk that includes a step for forming such certification pits. FIG. 2 shows a manufacturing procedure of an optical disk to which this embodiment relates. The manufacturing procedure is roughly made up of a substrate formation step S1, a reflective film application step S2, a protective film coating step S3, a bonding step S4, and a label printing step S5, like that for manufacturing a typical optical disk. However, the manufacturing procedure also includes a laser processing step S6 and a check step S7 which are conducted after the above steps. These steps are characteristic of this embodiment.

The laser processing step S6 applies a YAG (yttrium aluminum garnet) laser onto an optical disk, to form n processed parts on a plurality of tracks.

The check step S7 checks whether the processed parts have been formed on the plurality of tracks as a result of the YAG laser application as intended by the manufacturer. If the processed parts are "normal", the check step S7 judges the optical disk as a conforming product. If any imperfectly-processed part or naturally-occurring defect (described later) exists on the tracks, the check step S7 judges the optical disk as a nonconforming product.

This completes a general description of the optical disk manufacturing procedure. The following explains processed parts obtained by laser processing, in greater detail.

Figure 3:
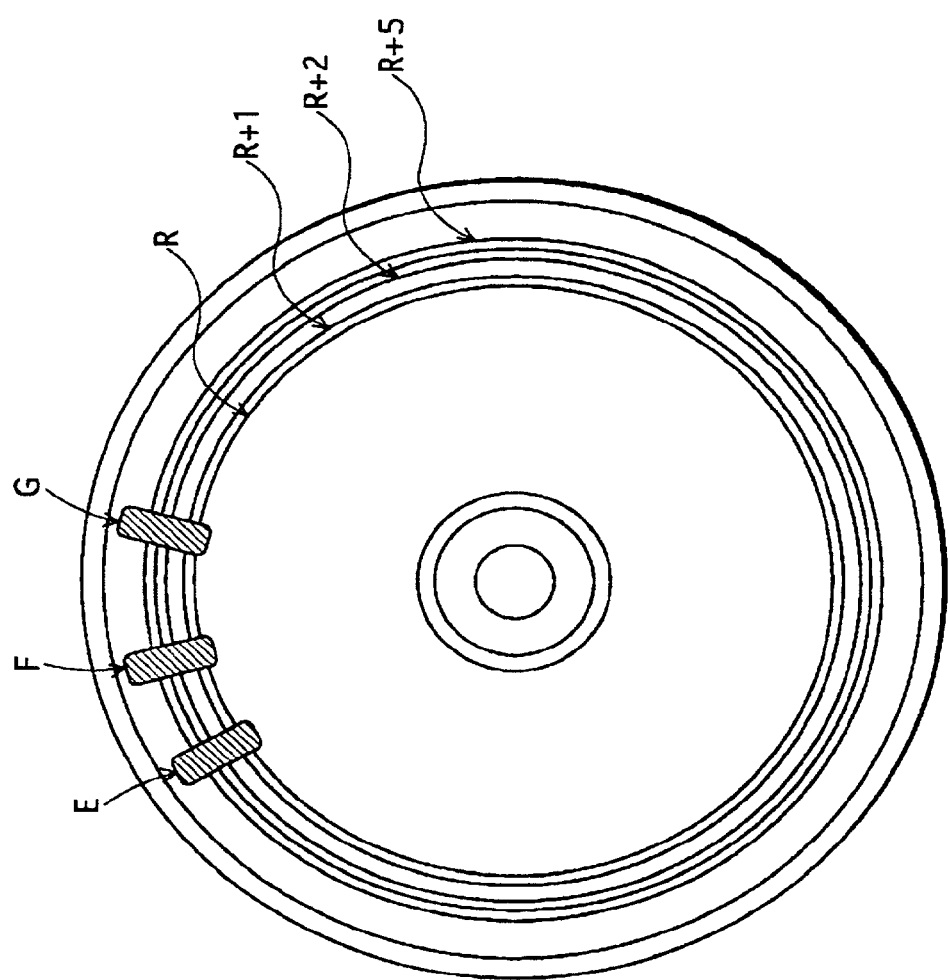
FIG. 3 shows three processed parts E–G formed by laser processing.

FIG. 3 shows three processed parts E, F, and G obtained by laser processing. These processed parts are provided on tracks R, R+1, R+2, R+3, . . . , and R+5, as shown in the drawing. The size of the processed parts in FIG. 3 is exaggerated for the sake of clarity. The actual size is too small to be visible by the naked eye.

Figure 4:
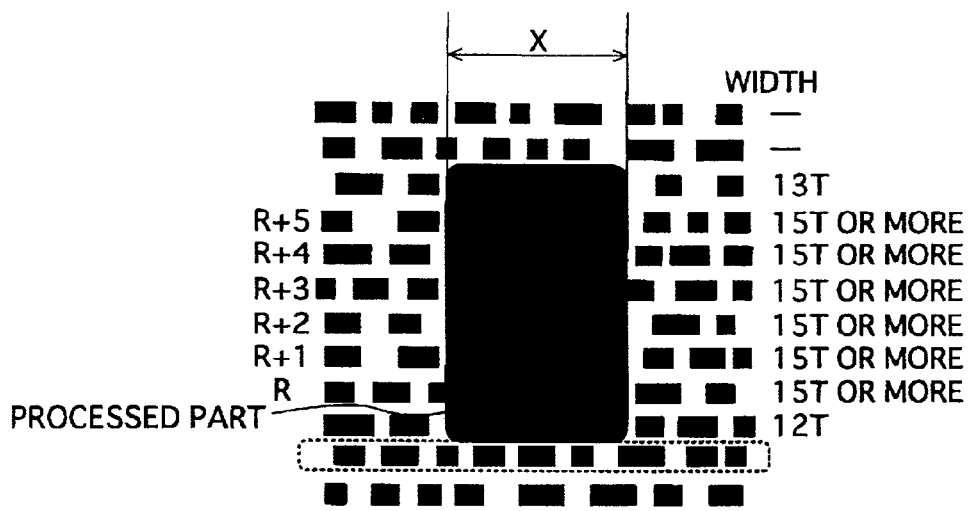
FIG. 4 is an enlarged view of a processed part formed by laser processing.

FIG. 4 is an enlarged view of one of processed parts E–G obtained by the laser processing. The processed part has a substantially rectangular shape. This processed part is present over adjacent tracks R, R+1, R+2, R+3, R+4, and R+5. The reflective film has melted and peeled off in the areas where the tracks intersect the processed part. The processed part has horizontal width X, which is no smaller than 15T and which allows error correction by error-correcting codes to be performed. Hence a pit with length X appears on each of these tracks. It should be noted here that the length of the intersecting part is below X on the tracks that correspond to the edges of the processed part. This is because edges formed by laser processing tend to be blunt. For example, when reading the six tracks shown in FIG. 4 in sequence, the resulting read signal contains six LOW segments whose width corresponds to length X.

In this embodiment, an optical disk is judged as being authentic if a plurality of pits of length X are aligned on a plurality of adjacent tracks in the radial direction, as shown in FIG. 4. On the other hand, an optical disk is judged as not being authentic if only one pit of length X exists or if a plurality of pits of length X are not aligned in the radial direction.

Such strict requirements for the authenticity of an optical disk reflects a desire to strengthen copyright protection. It may be possible to forge a pit of length X if higher unauthorized duplication techniques than casual copying are put to full use. However, without exceptionally advanced production facilities, it is impossible to align a plurality of pits of length X on a plurality of adjacent tracks in the radial direction as shown in FIG. 4. Thus, according to this embodiment, copyright protection is enhanced by setting strict requirements for the authenticity of an optical disk. This completes an explanation on the processed parts obtained by the processing step.

Figure 5:
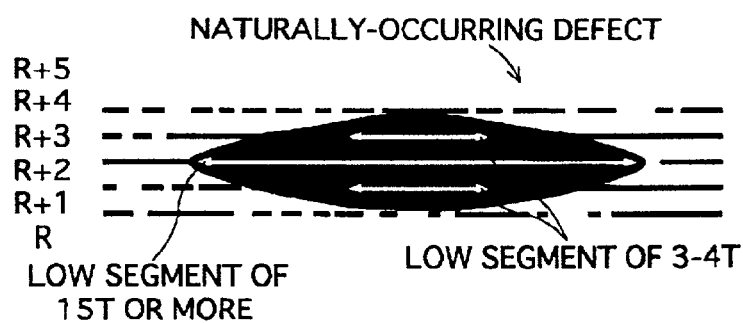
FIG. 5 is an enlarged view of a naturally-occurring defect.

The above processed parts are intentionally formed on the optical disk by the manufacturer. However, a pit of length X may be formed unintentionally. In more detail, during the manufacturing procedure of the optical disk, a defect which is confusable with a certification pit may naturally occur. This is caused due to loss of the reflective film, mixture of bubbles or dust, or presence of dirt. Statistically, such a naturally-occurring defect does not have a specific shape, unlike the rectangular shape of the processed part shown in FIG. 4. FIG. 5 is an enlarged view of a naturally-occurring defect. This naturally-occurring defect has an irregular shape of being extremely long in the horizontal direction and short in the vertical direction. The naturally-occurring defect intersects tracks R+1, R+2, and R+3. The intersecting parts have various lengths, unlike those of the processed part. In detail, the lengths of the intersecting parts range from 3T to 15T. An intersecting part of a naturally-occurring defect and a track, that has length X, is hereafter called a "defect pit". As mentioned above, the shape of a naturally-occurring defect is irregular. Accordingly, even if a defect pit exists on one track, this does not necessarily mean that a defect pit also exists on its adjacent track. A read signal obtained by reading a defect pit contains a LOW segment whose width corresponds to length X (hereafter called a "LOW segment X"), as in the case of reading a processed part. It is to be noted here that this embodiment does not assume the existence of a defect pit which is longer than length X, i.e., a defect pit which is too long to be corrected by error-correcting codes. This is because such a defect pit hardly occurs when manufacturing general optical disks.

Figure 6:
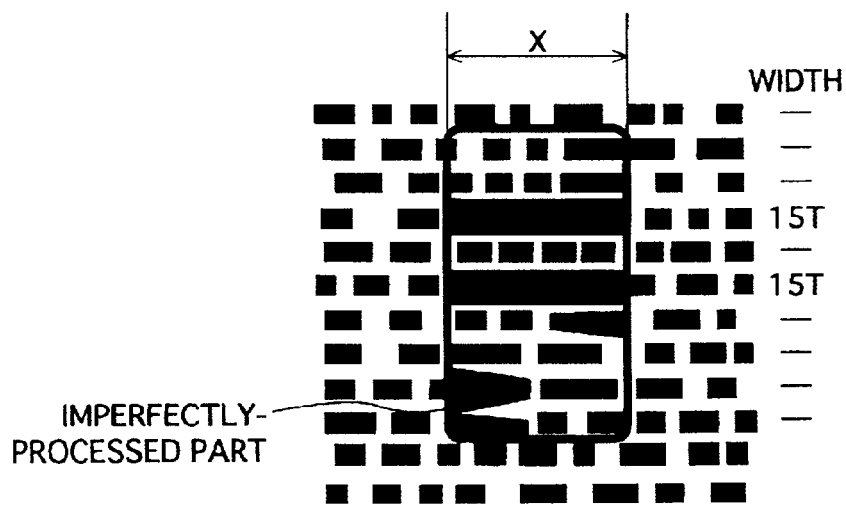
FIG. 6 is an enlarged view of an imperfectly-processed part.

An imperfectly-processed part is explained next. FIG. 6 is an enlarged view of an imperfectly-processed part. As illustrated, the imperfectly-processed part has a shape similar to the processed part shown in FIG. 4. However, the imperfectly-processed part tends to lack some of the pits of length X which should be present on adjacent tracks. As can be understood from the drawing, some of the intersecting parts with the tracks have gaps, as a result of which a pit of length X does not appear on each of the plurality of tracks. Instead, pits of length X appear only on some of the plurality of tracks. The gaps in the intersecting parts are caused by (a) the incomplete formation of the reflective film, (b) the end of the life of a laser beam emitting source, or (c) the presence of a problem in a laser itself.

The aforementioned naturally-occurring defects and imperfectly-processed parts can be regarded as by-products of the processing step. Here, even if a defect pit of length X exists on a track other than those on which certification pits are present, such a defect pit does not cause any problem in terms of quality. The reason for this is given below. As mentioned above, an optical disk reproduction device performs error correction on data which is read from an optical disk. This being so, if a defect pit of length X is present, the reproduction device corrects data corresponding to such a defect pit and uses the corrected data. Accordingly, this defect pit does not have an adverse effect on reproduction operations of the reproduction device. The same applies to a defect pit shorter than length X. However, if a defect pit exists between one certification pit and its succeeding certification pit, the reproduction device wrongly recognizes the defect pit as a certification pit. This is undesirable for quality control. The same can be said for an imperfectly-processed part. A method of checking the presence or absence of such defect pits and imperfectly-processed parts is explained below.

This method optically reads tracks and detects intersecting parts in sequence. For example, when n processed parts intersect five tracks, n intersecting parts exist on each track, meaning that there are 5×n intersecting parts on the five tracks. When reading the optical disk, these intersecting parts appear on the read signal as LOW segments X. If the five tracks are sequentially read outwardly, the resulting read signal contains 5×n LOW segments X. Of these LOW segments X, focus on arbitrary LOW segment $X_j$ and nth succeeding LOW segment $X_{j+n}$. Suppose LOW segment $X_j$ corresponds to the intersecting part of processed part S and track R. This being the case, LOW segment $X_{j+n}$ corresponds to the intersecting part of processed part S and track R+1 which is adjacent to track R. In other words, the interval between LOW segment $X_j$ and LOW segment $X_{j+n}$ is equivalent to the length of one track. Thus, in an optically read signal, the interval between LOW segment $X_j$ and nth succeeding LOW segment $X_{j+n}$ corresponds to the track length. Note that this regularity is based on the assumption that neither a naturally-occurring defect nor an imperfectly-processed part exists on these tracks.

Deviations from the regularity occur in the cases where (i) a naturally-occurring defect is present between certification pits and (ii) some intersecting part is missing as in the case of an imperfectly-processed part. In the case of (ii), a LOW segment corresponding to the missing intersecting part is absent, so that the nth succeeding LOW segment does not correspond to the intersecting part on adjacent track R+1. In the case of (i), one more LOW segment is present, so that the LOW segment corresponding to the intersecting part of processed part S and track R+1 is not the nth succeeding LOW segment but the (n+1)th succeeding LOW segment. Thus, in the cases of (i) and (ii), the regularity of the interval between LOW segment $X_j$ and LOW segment $X_{j+n}$ being equal to the track length is deviated.

In other words, when reading a plurality of tracks, the presence or absence of a defect pit or imperfectly-processed part can be determined by checking whether the regularity of the interval between LOW segment $X_j$ and nth succeeding LOW segment $X_{j+n}$ being equal to the track length holds true.

Figure 7:
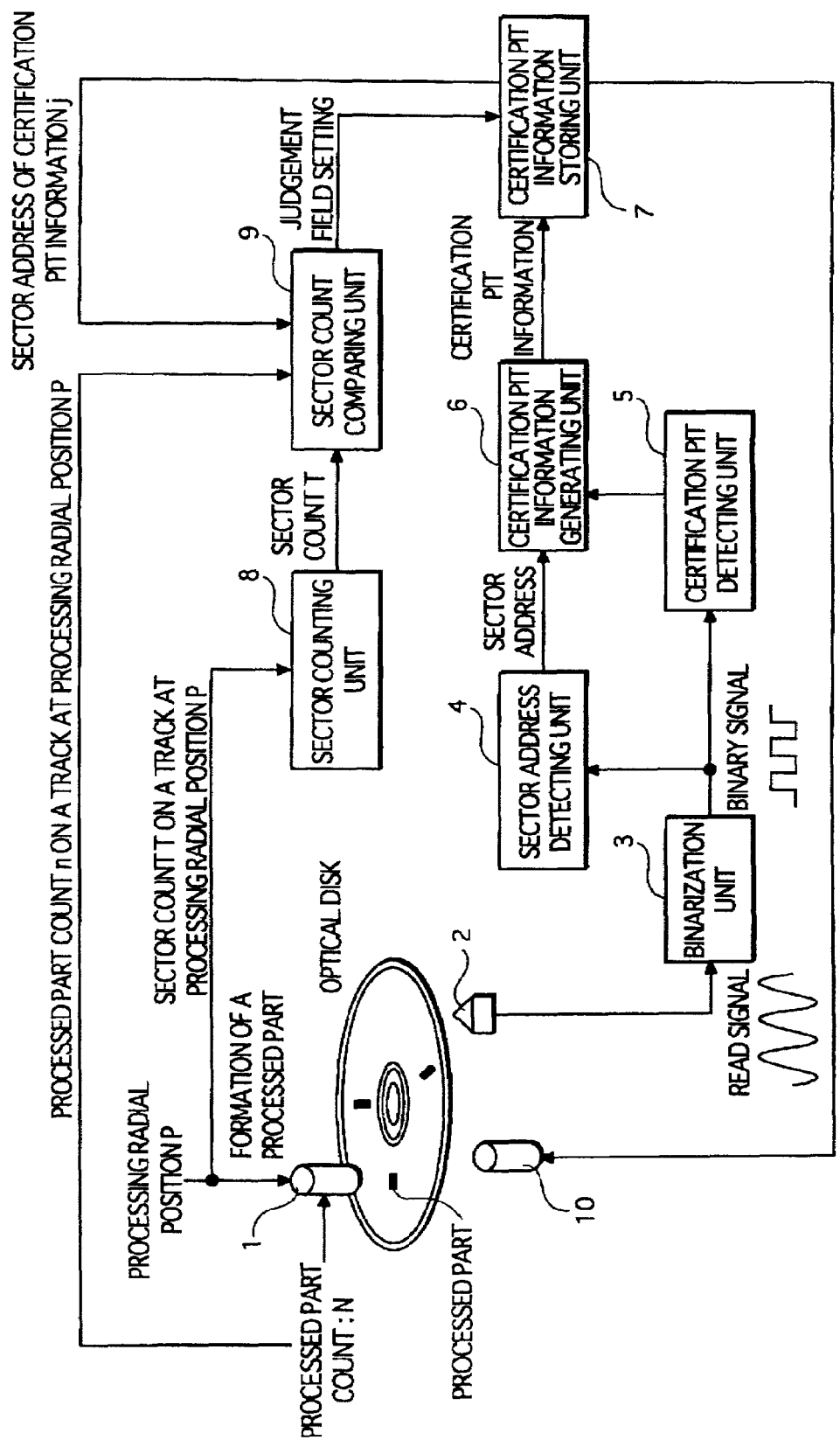
FIG. 7 shows an inner construction of a check device which is the first embodiment of the present invention.
Figure 8:
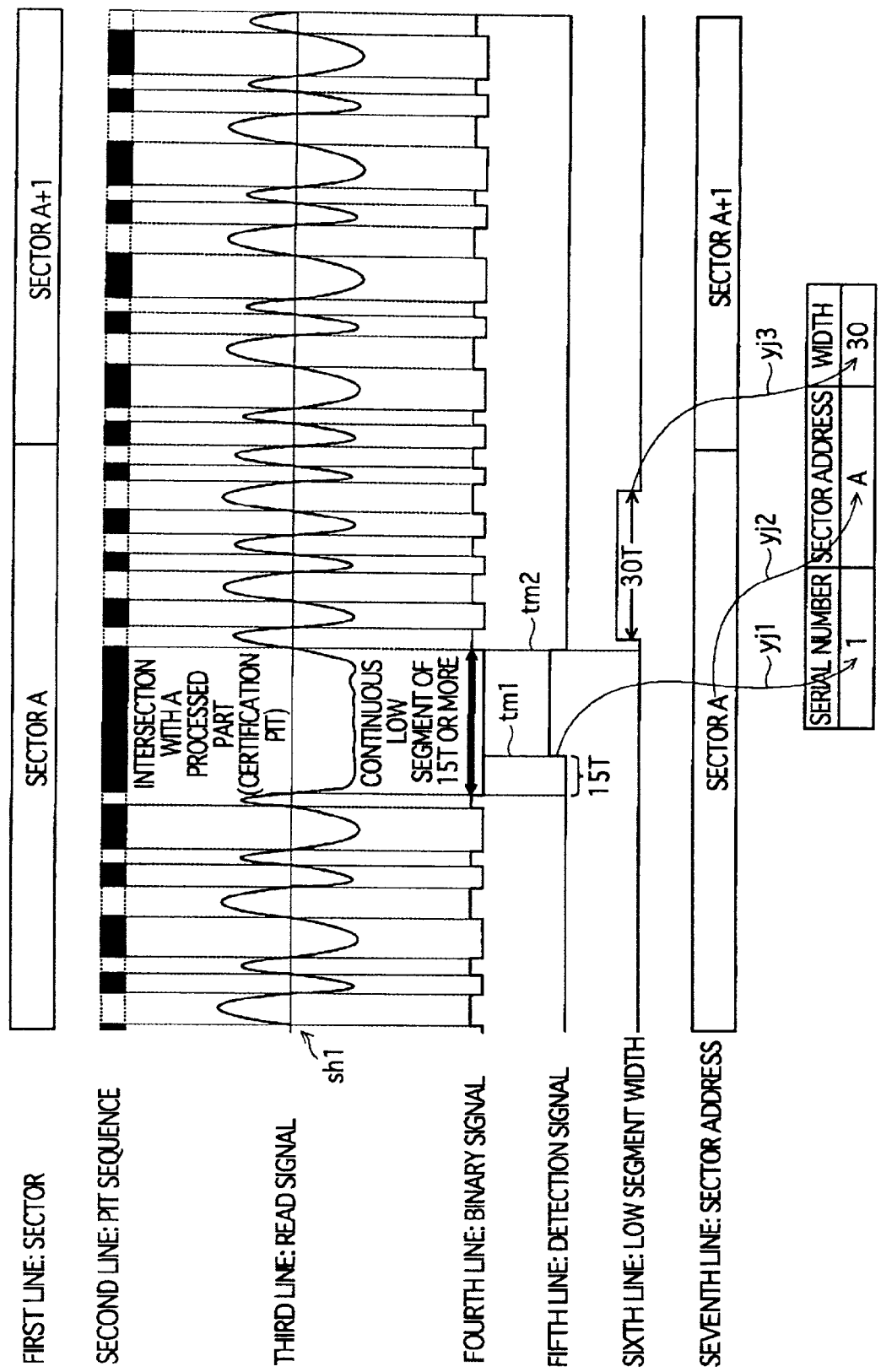
FIG. 8 is a timing chart showing how signals are input/output in the check device when one certification pit is read.

Based on the above theory, the check device of this embodiment is constructed to check the presence or absence of a defect pit or imperfectly-processed part. FIG. 7 shows an inner construction of the check device of this embodiment. As shown in the drawing, the check device includes a laser processing unit 1, a track scanning unit 2, a binarization unit 3, a sector address detecting unit 4, a certification pit detecting unit 5, a certification pit information generating unit 6, a certification pit information storing unit 7, a sector counting unit 8, a sector count comparing unit 9, and a certification pit information writing unit 10. The following explains the construction elements of the check device, by referring to FIG. 8. FIG. 8 is a timing chart showing how signals are input/output in the check device, when reading one of a plurality of intersecting parts.

The laser processing unit 1 performs laser processing n times. Laser processing applies a YAG laser onto an optical disk at processing radial position P.

The track scanning unit 2 is equipped with an optical head and an actuator. The track scanning unit 2 optically reads part of a plurality of tracks which have been processed by the laser processing unit 1. The first line of FIG. 8 shows sectors on a track to which an intersecting part belongs. The second line shows a pit sequence formed in these sectors. The third line shows a read signal obtained when the track scanning unit 2 reads the pit sequence shown in the second line, the read signal having a waveform corresponding to the pits and bumps in the pit sequence.

The binarization unit 3 converts the read signal obtained by the track scanning unit 2 into binary form, to obtain a binary signal. When a threshold value for the binarization is sh1 shown in the third line, a binary signal shown in the fourth line is obtained by the binarization unit 3.

The sector address detecting unit 4 detects a sector address from the binary signal output from the binarization unit 3. When the sector address detection is performed for the read signal shown in the third line, then sector addresses shown in the seventh line are output from the sector address detecting unit 4. In more detail, the sector address detecting unit 4 continuously outputs sector address "A" while a pit sequence that belongs to sector A is being read from the optical disk, and continuously outputs sector address "A+1" while a pit sequence that belongs to sector A+1 is being read from the optical disk.

The certification pit detecting unit 5 monitors the width of each LOW segment that forms the binary signal output from the binarization unit 3. If the width exceeds a predetermined upper limit, the certification pit detecting unit 5 outputs a detection signal indicating that a LOW segment X has been detected. The certification pit detecting unit 5 then waits until that LOW segment X changes to a HIGH segment. Once the change has occurred, the certification pit detecting unit 5 outputs a signal showing the width of the LOW segment X. In FIG. 8, a LOW segment X has lasted for 15T at time tm1. This being so, the certification pit detecting unit 5 outputs a detection signal at time tm1, as shown in the fifth line. Also, the LOW segment X changes to a HIGH segment at time tm2. Accordingly, the certification pit detecting unit 5 outputs a signal showing "30" which is the width of the LOW segment X at time tm2, as shown in the sixth line.

The certification pit information generating unit 6 generates, whenever an intersecting part of a certification pit or defect pit is detected, certification pit information specifying the position of the pit. The certification pit information generating unit 6 then writes the certification pit information to the certification pit information storing unit 7. The certification pit information is generated at the time where the detection signal is output from the certification pit detecting unit 5. The certification pit information is made up of a serial number, a sector address, a width, and a judgement field. The serial number is a number given to the intersecting part by the certification pit information generating unit 6. The sector address is the address detected by the sector address detecting unit 4. The width is the width of the LOW segment X detected by the certification pit detecting unit 5. In FIG. 8, the certification pit information is generated at time tm1 where the LOW segment X has lasted for 15T or more, with the sector address "A" detected by the certification pit detecting unit 5, a serial number "1", and the width "30" of the LOW segment X detected by the certification pit detecting unit 5 being set as shown by arrows yj1–yj3. Thus, the check device generates certification pit information each time a LOW segment X that lasts for 15T or more is detected.

The certification pit information storing unit 7 stores a plurality of sets of certification pit information generated by the certification pit information generating unit 6. FIG. 9 shows such a plurality of sets of certification pit information generated by the certification pit information generating unit 6. In the drawing, serial numbers "1", "2", "3", "4", and "5" each identify an intersecting part, indicating that the five intersecting parts have been detected in the order shown by the serial numbers. Addresses "A", "A+10", "A+24", "A+36", and "A+46" each indicate which sector the corresponding intersecting part belongs to. Widths "30", "40", "50", "33", and "38" each indicate the length of the corresponding intersecting part. Thus, certification pit information of every intersecting part detected when reading the plurality of tracks is stored in the certification pit information storing unit 7.

The sector counting unit 8 calculates how many processed parts (the number denoted by processed part count n) are provided on a track to which an intersecting part corresponding to certification pit information belongs. The number of sectors (the number denoted by sector count T) that compose one track varies according to the radial position of the track on the optical disk. As one example, when a track is located at a radial position of 30 mm, the number of sectors which compose the track is a non-integral value "36±1". Accordingly, the sector counting unit 8 calculates the number of sectors (sector count T) that compose the track to which the intersecting part belongs, from the radial position of the track on the optical disk.

The sector count comparing unit 9 retrieves a sector address from certification pit information j corresponding to intersecting part j and a sector address from certification pit information j+n corresponding to intersecting part j+n. The sector count comparing unit 9 then calculates the difference of the two sector addresses. If the difference is equal to sector count T which is the number of sectors of the track, the sector count comparing unit 9 judges that neither a defect pit nor an imperfectly-processed part exists between intersecting part j corresponding to certification pit information j and intersecting part j+n corresponding to certification pit information j+n. Hence the sector count comparing unit 9 determines that intersecting parts j and j+n are "normal". On the other hand, if the difference is not equal to sector count T, the sector count comparing unit 9 judges that a defect pit or an imperfectly-processed part exists between intersecting part j corresponding to certification pit information j and intersecting part j+n corresponding to certification pit information j+n. The sector count comparing unit 9 accordingly determines that intersecting parts j to j+n are "abnormal". Based on the judgement result, the sector count comparing unit 9 writes "normal" or "abnormal" to the judgement fields of the corresponding certification pit information.

The certification pit information writing unit 10 writes, of all sets of certification pit information stored in the certification pit information storing unit 7, each set of certification pit information whose judgement field is set as "normal" into a predetermined recordable or rewritable area of the optical disk. In this way, the intersecting parts corresponding to the sets of certification pit information whose judgement fields are set as "normal" are specified as certification pits.

Figure 10:
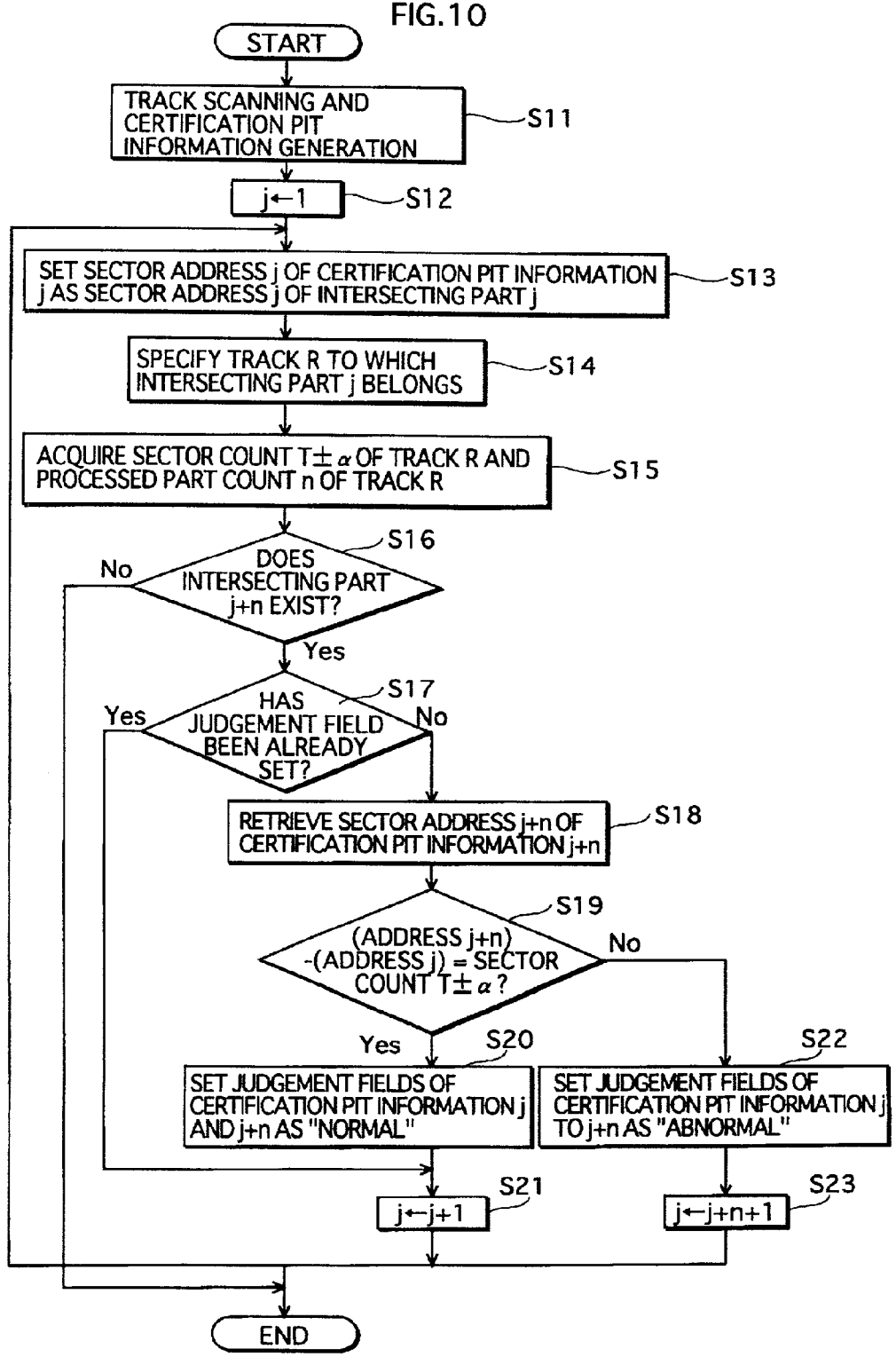
FIG. 10 is a flowchart showing a control structure of a program that realizes an operation of a sector count comparing unit shown in FIG. 7.

In the above constructed check device, the sector count comparing unit 9 plays a dominant role. The sector count comparing unit 9 is actually realized by a general-purpose computer and a program which can be executed by this computer. FIG. 10 is a flowchart showing a control structure of this program. The control structure is roughly made up of track scanning by the track scanning unit 2 and certification pit information generation by the certification pit information generating unit 6 (S11) and the subsequent loop processing of steps S12–S23. The loop processing uses variable j as a control variable. The loop processing repeats a procedure of setting a judgement field of the jth certification pit information in step S20 or S22, for each set of certification pit information stored in the certification pit information storing unit 7. Step S20 sets the judgement fields of certification pit information j and j+n as "normal", whereas step S22 sets the judgement fields of certification pit information j to j+n as "abnormal". Switching between steps S20 and 22 depends on steps S13, S18, and S19. Step S13 retrieves a sector address from certification pit information j (the sector address is hereafter called "sector address j"), whereas step S18 retrieves a sector address from certification pit information j+n (the sector address is hereafter called "sector address j+n"). Step S19 judges whether (sector address j+n)−(sector address j) is equal to sector count T. If so, step S20 is executed. Otherwise, step S22 is executed.

Step S16 defines a condition to end the loop processing. Which is to say, the loop processing ends if intersecting part j+n does not exist. Here, the value n is computed by specifying track R to which intersecting part j belongs (S14), and detecting the number of sectors (sector count T) that compose track R and the number of processed parts (processed part count n) that are provided on track R (S15).

Step S12 initializes control variable j. Steps S21 and S23 increment control variable j. Step S21 is performed when (i) the judgement fields are set in step S20 and when (ii) the judgement field is judged as having already been set in step S17.

Step S23 is performed when the judgement fields are set in step S22. The increment of control variable j in step S23 is not 1 but 1+n, to skip n intersecting parts to select the next judgement target. The sector count comparing unit 9 operates according to this control structure, as a result of which the judgement field of each set of certification pit information is set.

Three typical operation examples are given below. These operation examples assume that processed part count n is 3.

The first example concerns the case where three processed parts intersect two tracks R and R+1, as shown in FIG. 11A. FIG. 11B shows a detection signal read from such tracks R and R+1. FIG. 11C shows five sets of certification pit information generated based on the detection signal.

Suppose these five sets of certification pit information are stored in the certification pit information storing unit 7. Sector address A in certification pit information 1 corresponding to the first intersecting part and sector address A+36 in certification pit information 4 (=1+3) corresponding to the fourth intersecting part (i.e., the third succeeding intersecting part) have a difference of S=36. Since difference S is within a range of 36±1 which is the number of sectors for one track, the judgement fields of certification pit information 1 and 4 are set as "normal". The result of this is shown in FIG. 11D.

The second example concerns the case where one naturally-occurring defect intersects two tracks R and R+1 together with the three processed parts, as shown in FIG. 12A. FIG. 12B shows a detection signal read from such tracks R and R+1. FIG. 12C shows five sets of certification pit information generated based on the detection signal.

Suppose these five sets of certification pit information are stored in the certification pit information storing unit 7. Sector address A in certification pit information 1 corresponding to the first intersecting part and sector address A+24 in certification pit information 4 corresponding to the fourth intersecting part have a difference of S=24. Difference S is compared with 36±1 which is the number of sectors for one track. Since difference S is smaller than the sector count, the judgement fields of certification pit information 1 to 4 are set as "abnormal". The result of this is shown in FIG. 12D.

The third example concerns the case where one of the three processed parts has been imperfectly processed. FIG. 13A shows a typical example of such a case. FIG. 13B shows a detection signal in which intersecting parts at sector addresses A+10 and A+46 have not been detected since the peeling and melting of the reflective film at these parts is imperfect. Which is to say, the detection signal shown in FIG. 13B lacks LOW segments X of sector addresses A+10 and A+46, so that certification pit information is not generated for these intersecting parts. FIG. 13C shows four sets of certification pit information corresponding to sector addresses A, A+24, A+36, and A+50, which are stored in the certification pit information storing unit 7.

This being so, sector address A in certification pit information 1 and sector address A+50 in certification pit information 4 have a difference of S=50, which is larger than 36±1 that is the number of sectors for one track. Accordingly, the sector count comparing unit 9 judges that some necessary intersecting part is missing between the first and fourth intersecting parts. As a result, the judgement fields of certification pit information 1 to 4 are set as "abnormal", as shown in FIG. 13D.

Thus, the check device of this embodiment measures the interval between a LOW segment and an nth succeeding LOW segment in a read signal, to determine the presence or absence of a defect pit or imperfectly-processed part. This significantly reduces the time required to check the processed parts. Accordingly, even if the step for checking the processed parts is added to the manufacturing procedure, the production schedule will not be missed. This delivers a prominent effect of producing copyrighted optical disks with high quality in large quantity.

Second Embodiment

The first embodiment checks whether the interval between a LOW segment and an nth succeeding LOW segment is equal to the track length. The second embodiment counts how many LOW segments whose width corresponds to length X appear in a read signal obtained by reading from a plurality of tracks which intersect processed parts. The quality of an optical disk is judged based on this count.

Figure 14:
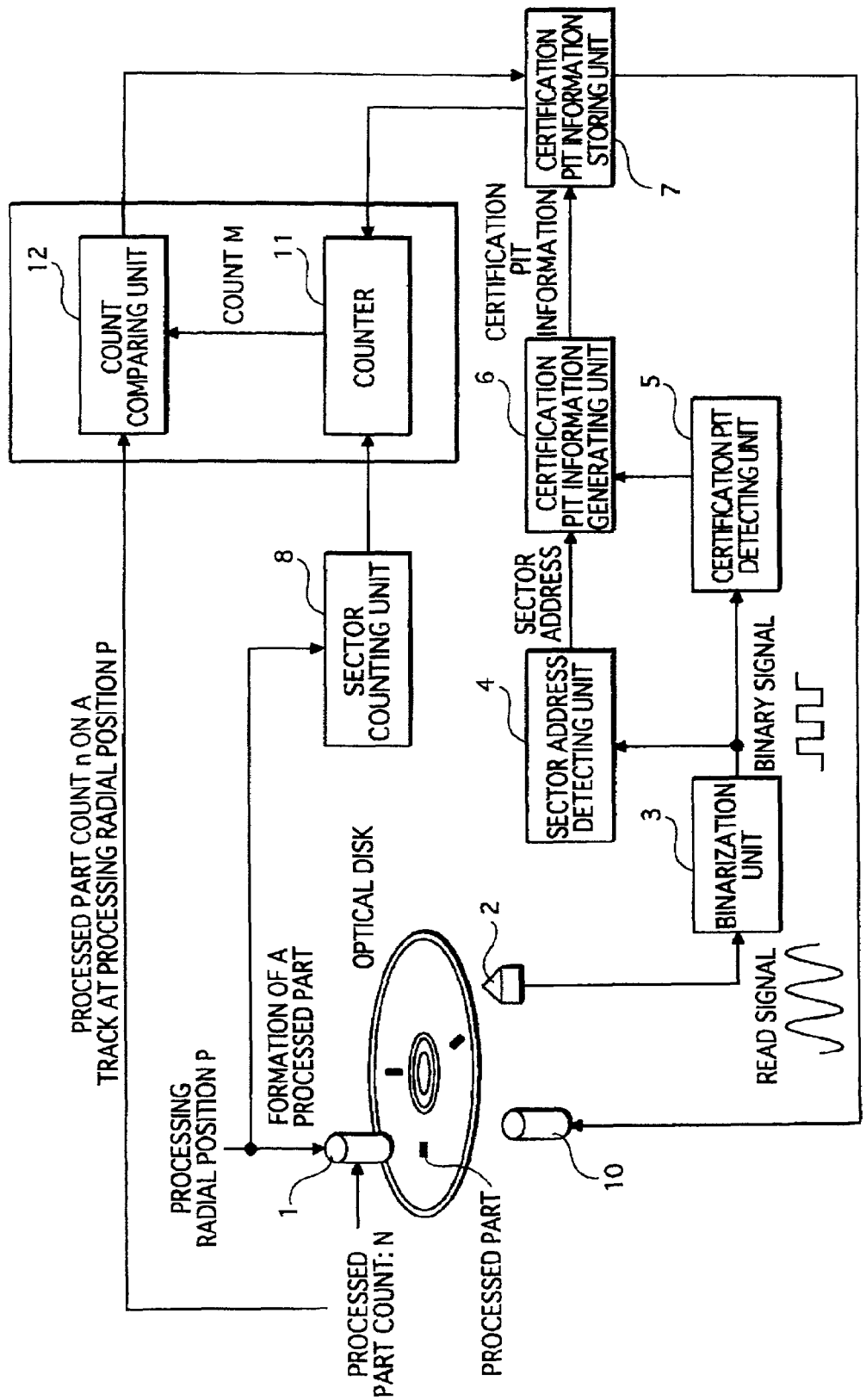
FIG. 14 shows an inner construction of a check device which is the second embodiment of the present invention.

FIG. 14 shows an inner construction of a check device to which the second embodiment relates. In the drawing, the sector count comparing unit 9 shown in FIG. 7 has been replaced by a counter 11 and a count comparing unit 12.

The counter 11 finds the number of sets of certification pit information (the number denoted by certification pit information count M) generated for one track, based on the number of sectors of the track obtained by the sector counting unit 8 and certification pit information stored in the certification pit information storing unit 7. Suppose the plurality of sets of certification pit information shown in FIG. 11C were detected. Then there are three sets of certification pit information for the 36±1 sectors of the track, so that the number of sets of certification pit information for the track is M=3.

The count comparing unit 12 compares certification pit information count M obtained by the counter 11, with the number of certification pits (the number denoted by certification pit count n) which were formed on the track.

If M=n, it means all of the n certification pits were detected. The count comparing unit 12 accordingly sets the judgement fields of the corresponding sets of certification pit information in the certification pit information storing unit 7, as "normal".

If M>n, it means (M−n) defect pits are included in the M intersecting parts corresponding to the M sets of certification pit information. The count comparing unit 12 accordingly sets the judgement fields of the corresponding sets of certification pit information in the certification pit information storing unit 7, as "abnormal".

If M<n, it means (n−M) certification pits were not detected. This indicates either the (n−M) certification pits were imperfectly processed, or the (n−M) certification pits were not properly detected. The count comparing unit 12 accordingly sets the judgement fields of the corresponding sets of certification pit information in the certification pit information storing unit 7, as "abnormal".

Once the judgement for all sets of certification pit information stored in the certification pit information storing unit 7 has completed, each set of certification pit information whose judgement field is "normal" is written into the recordable or rewritable area of the optical disk.

Thus, this embodiment judges the presence or absence of a defect pit, by comparing the number of certification pits and the number of sets of certification pit information generated for one track. This embodiment can also determine the presence of an imperfectly-processed part.

The following examines which of the first and second embodiments is more effective. Suppose one certification pit on a track is missing due to imperfect laser processing, whilst a defect pit is present on the same track. This should be judged as being "abnormal", because both an imperfectly-processed part and a defect pit are present on the track. According to the second embodiment, however, the number of LOW segments X which are included in the read signal obtained from the track is used for the check, so that there is a danger of judging the above case as being "normal". According to the first embodiment, on the other hand, the interval of pits having length X is used for the check, so that the above case is judged as being "abnormal". Thus, the case which may be overlooked in the second embodiment can be correctly judged as being "abnormal" in the first embodiment. For this reason, the first embodiment is more preferable to perform a precise check.

The present invention has been described by way of the above embodiments, though these embodiments are mere examples of systems that are presently expected to operate favorably. It should be obvious that various modifications can be made without departing from the technical scope of this invention. Six representative examples of such modifications are given below.

(A) The tracks which are to be read in the first embodiment are preferably limited to those that allow the actuator to drive the head. This is because extending the read range to such an extent that requires head seeking causes the time taken to check one optical disk to be prolonged.

(B) In the first embodiment, if the interval between two LOW segments is not equal to the track length due to the existence of a defect pit or the like, it is preferable to retry a check after a plurality of tracks are skipped to set the next reading position of the track scanning unit 2. As shown in FIG. 12A, a naturally-occurring defect tends to be small when compared with a processed part. Therefore, by skipping a plurality of tracks, the sector count comparing unit 9 may obtain a judgement result "normal". Such a retry helps improve the quality of optical disks, with it being possible to enhance yield.

(C) The check device in the first embodiment performs a check during manufacturing of optical disks prior to shipment, but optical disks which have already been shipped and possessed by users may be subjected to such a check. A delivery terminal is one example of checking a user's optical disk using the check device. The delivery terminal is installed in a convenience store or the like, and provides a service of receiving a delivery of digital work and writing it to a user's optical disk. To prevent casual copying, it is necessary to restrict the use of the written digital work to that optical disk. Therefore, the delivery terminal performs the processing explained in the first embodiment on the optical disk. Such a processed optical disk is then subjected to the check described in the first embodiment. To do so, the check device is equipped in the delivery terminal.

(D) The first embodiment describes the case where the sector counting unit 8 calculates the length of a track on which a processed part exists. However, if the position of the processed part is fixed, the sector counting unit 8 may be omitted.

(E) The main feature of the check device of the first embodiment is the operation of the sector count comparing unit 9. This feature is realized by a program installed in the check device (see the flowchart of FIG. 10). Therefore, the present invention may be the program that realizes this feature. This program may be recorded on a computer-readable recording medium and transferred or lent. The program may also be transmitted via a network.

Also, the features other than the above feature are substantial features that are to be implemented to improve the program, so that a program that achieves these features may be provided independently.

(F) An imperfectly-processed part such as that shown in FIG. 6 occurs due to (b) the end of the life of the laser beam emitting source or (c) the presence of a problem in the laser itself, as mentioned above. Accordingly, when the LOW segment interval is found to exceed the track length, a warning may be produced to inform of a possibility of any of these abnormalities (b) and (c). This facilitates measures such as replacing the laser.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A check device for checking whether a naturally-occurring defect exists between any two certification pits of n certification pits provided on each of a plurality of adjacent tracks on an optical disk to certify that the optical disk is authentic, n being an integer that satisfies n≧1, each certification pit having a predetermined length, and the naturally-occurring defect having a length substantially equal to the predetermined length, the check device comprising:

reading means for optically reading the plurality of adjacent tracks, to obtain a signal corresponding to the plurality of adjacent tracks;

detecting means for detecting a plurality of signal segments which each have a duration corresponding to the predetermined length, from the signal; and judging means for judging, if an interval between a signal segment and an nth succeeding signal segment is different from a reference value, that the naturally-occurring defect exists between two certification pits.

2. The check device of claim 1,
wherein a certification pit and an nth succeeding certification pits are located on a same radius on the optical disk,
the reference value corresponds to a length of a track, and
if no naturally-occurring defect exists, the interval is equal to the reference value.

3. The check device of claim 2,
wherein a plurality of certification pits which are located on a same radius on the optical disk are formed by one application of a laser beam.

4. The check device of claim 1,
wherein the interval is expressed by a difference between an address of a sector corresponding to the signal segment and an address of a sector corresponding to the nth succeeding signal segment, and
the judging means compares the difference with a number of sectors which compose a track.

5. A check device for checking whether a naturally-occurring defect or an imperfectly-formed certification pit exists between any two certification pits of an optical disk processed to form n certification pits on each of a plurality of adjacent tracks to certify that the optical disk is authentic, n being an integer that satisfies n≧1, each certification pit having a predetermined length, and the naturally-occurring defect having a length substantially equal to the predetermined length, the check device comprising:
reading means for optically reading the plurality of adjacent tracks, to obtain a signal corresponding to the plurality of adjacent tracks;
detecting means for detecting a plurality of signal segments which each have a duration corresponding to the predetermined length, from the signal; and
judging means for judging
(a) if an interval between a signal segment and an nth succeeding signal segment is shorter than a reference value, that the naturally-occurring defect exists between two certification pits, and
(b) if the interval is longer than the reference value, that the imperfectly-formed certification pit exists between two certification pits.

6. The check device of claim 5,
wherein a certification pit and an nth succeeding certification pit are located on a same radius on the optical disk,
the reference value corresponds to a length of a track, and
if neither a naturally-occurring defect nor an imperfectly-formed certification pit exists, the interval is equal to the reference value.

7. The check device of claim 6,
wherein a plurality of certification pits which are located on a same radius on the optical disk are formed by one application of a laser beam.

8. The check device of claim 5,
wherein the interval is expressed by a difference between an address of a sector corresponding to the signal segment and an address of a sector corresponding to the nth succeeding signal segment, and
the judging means compares the difference with a number of sectors which compose a track.

9. A check device for checking whether a naturally-occurring defect or an imperfectly-formed certification pit exists between any two certification pits of optical disk processed to form n certification pits on each of a plurality of adjacent tracks to certify that the optical disk is authentic, n being an integer that satisfies n≧1, each certification pit having a predetermined length, and the naturally-occurring defect having a length substantially equal to the predetermined length, the check device comprising:
reading means for optically reading the plurality of adjacent tracks, to obtain a signal corresponding to the plurality of adjacent tracks;
detecting means for detecting a plurality of signal segments which each have a duration corresponding to the predetermined length, from the signal; and
judging means for judging
(a) if a number of signal segments detected for any of the plurality of adjacent tracks is greater than n, that the naturally-occurring defect exists between two certification pits, and
(b) if the number of signal segments is smaller than n, that the imperfectly-formed certification pit exists between two certification pits.

10. A program stored on a computer-readable recording medium for execution by a computer for checking whether a naturally-occurring defect exists between any two certification pits of n certification pits provided on each of a plurality of adjacent tracks on an optical disk to certify that the optical disk is authentic, n being an integer that satisfies n≧1, each certification pit having a predetermined length, and the naturally-occurring defect having a length substantially equal to the predetermined length, the program comprising:
a reading operation of optically reading the plurality of adjacent tracks, to obtain a signal corresponding to the plurality of adjacent tracks;
a detecting operation of detecting a plurality of signal segments which each have a duration corresponding to the predetermined length, from the signal; and
a judging operation of judging, if an interval between a signal segment and an nth succeeding signal segment is different from a reference value, that the naturally-occurring defect exists between two certification pits.

11. A program stored on a computer-readable recording medium for execution by a computer for checking whether a naturally-occurring defect or an imperfectly-formed certification pit exists between any two certification pits of an optical disk processed to form n certification pits on each of a plurality of adjacent tracks to certify that the optical disk is authentic, n being an integer that satisfies n≧1, each certification pit having a predetermined length, and the naturally-occurring defect having a length substantially equal to the predetermined length, the program comprising:
a reading operation of optically reading the plurality of adjacent tracks, to obtain a signal corresponding to the plurality of adjacent tracks;
a detecting operation of detecting a plurality of signal segments which each have a duration corresponding to the predetermined length, from the signal; and
a judging step for judging
(a) if an interval between a signal segment and an nth succeeding signal segment is shorter than a reference value, that the naturally-occurring defect exists between two certification pits, and
(b) if the interval is longer than the reference value, that the imperfectly-formed certification pit exists between two certification pits.

12. A program stored on a computer-readable recording medium for execution by a computer for checking whether a naturally-occurring defect or an imperfectly-formed certification pit exists between any two certification pits of an optical disk processed to form n certification pits on each of a plurality of adjacent tracks to certify that the optical disk is authentic, n being an integer that satisfies $n \geq 1$, each certification pit having a predetermined length, and the naturally-occurring defect having a length substantially equal to the predetermined length, the program comprising:

a reading operation of optically reading the plurality of adjacent tracks, to obtain a signal corresponding to the plurality of adjacent tracks;

a detecting operation of detecting a plurality of signal segments which each have a duration corresponding to the predetermined length, from the signal; and a judging step for judging (a) if a number of signal segments detected for any of the plurality of tracks is greater than n, that the naturally-occurring defect exists between two certification pits, and (b) if the number of signal segments is smaller than n, that the imperfectly-formed certification pit exists between two certification pits.

\* \* \* \* \*

UNITED STATES PATENT AND TRADEMARK OFFICE
CERTIFICATE OF CORRECTION

PATENT NO. : 7,092,333 B2 Page 1 of 1
APPLICATION NO. : 10/122303
DATED : August 15, 2006
INVENTOR(S) : Koichi Morioka et al.

It is certified that error appears in the above-identified patent and that said Letters Patent is hereby corrected as shown below:

ON THE TITLE PAGE
Item [56]
Under Other Publications, line 1, please replace "Apr. 12,2001," with --Apr. 12, 2001,--.

Title page item [57] Abstract, line 5, please replace "and nth" with --and *n*th--.

In column 13, line 3, please replace "pits are" with --pit are--.

Signed and Sealed this

Ninth Day of January, 2007

JON W. DUDAS
*Director of the United States Patent and Trademark Office*